(12) United States Patent
Pirotais

(10) Patent No.: US 9,181,965 B2
(45) Date of Patent: Nov. 10, 2015

(54) HYDRAULIC APPARATUS CONTROL SYSTEM

(71) Applicant: AGCO SA, Beauvais (FR)

(72) Inventor: Jacques Pirotais, Glatigny (FR)

(73) Assignee: AGCO SA, Beauvais (FR)

( * ) Notice: Subject to any disclaimer, the term of this patent is extended or adjusted under 35 U.S.C. 154(b) by 554 days.

(21) Appl. No.: 13/630,626

(22) Filed: Sep. 28, 2012

(65) Prior Publication Data

US 2013/0081716 A1    Apr. 4, 2013

(30) Foreign Application Priority Data

Sep. 30, 2011    (GB) .................................. 1116867.1

(51) Int. Cl.
*F17D 3/00*    (2006.01)
*F15B 21/08*   (2006.01)
*F16K 37/00*   (2006.01)

(52) U.S. Cl.
CPC ............. *F15B 21/08* (2013.01); *F16K 37/0075* (2013.01); *F17D 3/00* (2013.01); *Y10T 137/8158* (2015.04)

(58) Field of Classification Search
CPC ... F15B 21/08; Y10T 137/8158; F16K 37/00; F16K 37/0075; F17D 3/00
USPC .................................................. 137/899, 551
See application file for complete search history.

(56) References Cited

U.S. PATENT DOCUMENTS 7,142,968 B2 * 11/2006 Alexander et al. .............. 701/50
8,392,075 B2 *  3/2013 Mindeman et al. ............. 701/50

FOREIGN PATENT DOCUMENTS

EP           1193582 A1    4/2002
WO    WO-2011/033014 A1    3/2011

OTHER PUBLICATIONS

GB Search Report for GB Application No. 1116867.1 Dated Jan. 30, 2012.

* cited by examiner

*Primary Examiner* — Kevin Lee

(57) ABSTRACT

A hydraulic apparatus control system includes a plurality of directional control valves. Each valve serves to selectively convey pressurized fluid to a hydraulic consumer which is detachably connected to a respective hydraulic output. A plurality of user interface devices control the valves. A terminal includes a display and user input means. The display displays a graphic associated with each hydraulic output. Each graphic includes a displayed user-definable label.

13 Claims, 3 Drawing Sheets ial control valves each for selectively conveying pressurised fluid to a hydraulic consumer detachably connected to a respective hydraulic output, a plurality of user interface devices to control the valves, a terminal comprising a display and user input means, wherein the display displays a graphic associated with each hydraulic output, and wherein each graphic includes a displayed user-definable label. Advantageously, an operator is therefore able to assign a label to each graphic representation on the display which makes operation of the multitude of user interface devices less onerous.

HYDRAULIC APPARATUS CONTROL SYSTEM

CROSS-REFERENCE TO RELATED APPLICATION

The present application claims the benefit of and priority from United Kingdom Application No. 1116867.1, filed Sep. 30, 2011, the entire disclosure of which is hereby incorporated by reference.

FIELD OF THE INVENTION

The invention relates generally to control systems for hydraulic apparatus and particularly, but not exclusively so, to those installed on agricultural tractors wherein various interchangeable implements are hydraulically connected to the apparatus.

BACKGROUND

Many tractor-mounted implements include hydraulic consumers such as motors and cylinders. Each hydraulic consumer is hydraulically coupled to a respective control valve on the tractor. Typically a tractor may include six or eight directional control valves (or spool valves) each having an associated coupling member and a user interface device. The couplings are mounted at various locations on the tractor, the majority being positioned at the rear of the vehicle for receiving associated pipework from attached implements. The user interface device typically comprises a joystick, lever or switch which is operable by a driver.

In operation a driver controls the various consumers by operation of a user interface device which directly or indirectly controls the associated directional control valve so as to control the delivery of pressurised fluid to the hydraulic consumer.

Over the past two decades or so the trend for agricultural implements has been for an increase in hydraulic consumers to remotely control various functions previously controlled manually. For example, a modern trailer typically includes hydraulics cylinders to control the opening of the rear tailgate, the steering axle and lifting of the body.

Modern tractors, and particularly high horse power tractors, include a driver terminal which includes a display and associated user input means such as buttons located around the display. The terminal serves primarily to communicate the state of various functions on the tractor and implement during operation. It is known to display a graphical representation of the various hydraulic consumers coupled to the tractor to communicate the current status of each consumer to the driver. Such functionality is available for example on the Datatronic III system fitted to selected Massey Ferguson tractors.

The increase in number of hydraulic consumers makes operation of the implement more and more complex for the driver. The complexity and demands on the driver's memory is compounded by the regular interchanging of implements which come with different functionality.

SUMMARY OF INVENTION

It is an object of the invention to provide a hydraulic apparatus control system which is easier to operate and less mentally demanding.

In accordance with the invention there is provided a hydraulic apparatus control system comprising a plurality of directional control valves each for selectively conveying pressurised fluid to a hydraulic consumer detachably connected to a respective hydraulic output, a plurality of user interface devices to control the valves, a terminal comprising a display and user input means, wherein the display displays a graphic associated with each hydraulic output, and wherein each graphic includes a displayed user-definable label. Advantageously, an operator is therefore able to assign a label to each graphic representation on the display which makes operation of the multitude of user interface devices less onerous.

The control system may further comprise memory means which stores one or more sets of user-definable labels as a stored data set, wherein the stored data set can be recalled by a user at a later stage. Therefore, with reference to a system installed on an agricultural tractor, each stored data set may correspond to a specific implement wherein that data set can be recalled when that implement is attached. Advantageously, this dispenses with the need for the driver to re-enter each label when the implement is changed. The user input means may be arranged to enable the operator to assign a name to the various sets of user-definable labels.

The control system may further comprise an electronic control unit (ECU) which may include memory means for the function described above. The ECU unit may be connected to the terminal as in known systems.

In one embodiment of the invention the user interface devices are of a form which generate electrical signals which are communicated to the ECU. Furthermore, the directional control valves may also respond to electrical signals, for example solenoid-actuated valves. In this case the electrical signals may be transmitted directly by the respective user interface devices or indirectly via the ECU.

In an alternative embodiment of the invention the user interface devices are mechanically coupled to the respective directional control valves so that operation of a lever for example moves a spool to activate the valve accordingly.

The user interface devices may take various different forms and may include levers, switches or buttons for example. The user input means may also take various different forms and may comprise a touch sensitive display for example.

The invention is particularly suited to implementation on an agricultural tractor. However, the principles of the invention are not limited to such and various other applications are envisaged.

BRIEF DESCRIPTION OF THE DRAWINGS

A specific embodiment of the invention will now be described with reference to the appended drawings in which.

DESCRIPTION OF EXAMPLE EMBODIMENT

Figure 1:
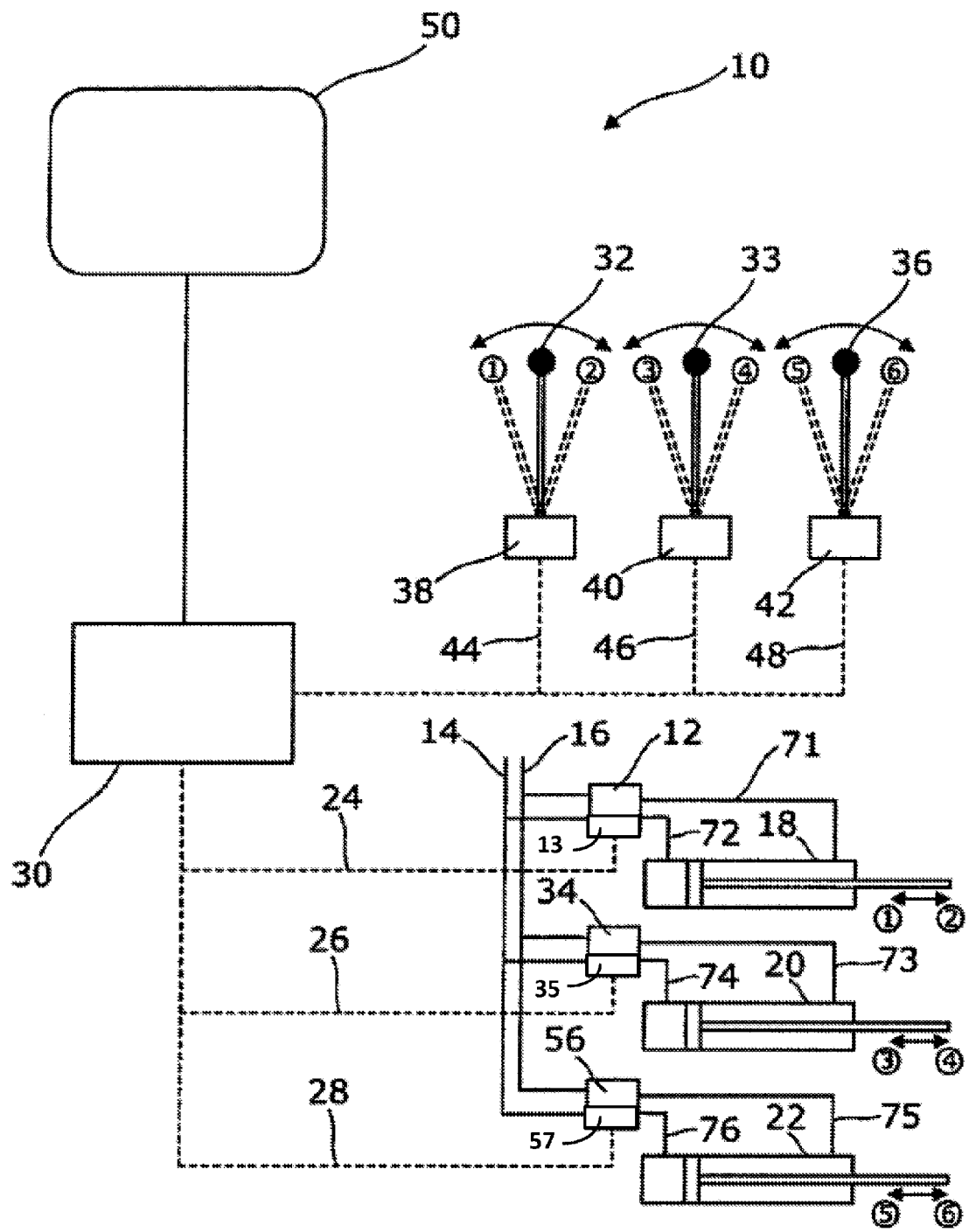
FIG. 1 is a schematic diagram of a hydraulic apparatus control system in accordance with an embodiment of the invention.

With reference to FIG. 1 a hydraulic apparatus control system 10 is installed on an agricultural tractor (not shown). The system 10 comprises three dual port spool valves 12, 34, 56 which are commonly installed on tractors of today. Each valve 12, 34, 56 has two inputs connected to a high pressure hydraulic source 14 and a low pressure (or tank) line 16.

A respective two-way hydraulic cylinder 18, 20, 22 is connected to each valve 12, 34, 56 by a quick-release coupling (not shown).

It should be understood that in most situations the hydraulic cylinders 18, 20, 22, or indeed any hydraulic consumer, will be associated with an attached implement and do not, in fact, form part of the hydraulic control system fitted to the tractor. The system shown in FIG. 1 is merely representative of an example set of hydraulic consumers and the specific permutation of different types are endless. For example, instead of dual acting hydraulic cylinders, single-acting hydraulic cylinders (or indeed hydraulic motors) may be coupled via the quick release coupling to the various valves 12, 34, 56 depending on the implement attached. By way of further example, a trailer tailgate may be controlled by a dual-acting hydraulic cylinder whereas the body lift and trailer brakes may be operated by a single-acting hydraulic cylinder.

Each valve 12, 34, 56 serves to direct pressurised fluid from high pressure line 14 to the hydraulic cylinders 18, 20, 22 in order to either extend or retract the respective piston rods as in known systems. To complete the hydraulic circuit during actuation, the valves 12, 34, 56 direct exhausted fluid to the low pressure line 16.

In the example shown each valve 12, 34, 56 is electrically activated by an integrated solenoid 13, 35, 57 and is thus connected electrically by wires 24, 26, 28 (shown as a dashed line in FIG. 1) to an electronic control unit (ECU) 30.

Also connected electrically to ECU 30 are three control levers 32, 33, 36. As in known tractor hydraulic control systems each lever 32, 33, 36 can be deflected around a pivot axis either side of a neutral position in to which the lever is biased by a spring (not shown). FIG. 1 illustrates each lever as a solid line in the neutral central position and a dashed line in the two activation positions.

Each lever 32, 33, 36 is mounted to a respective mounting box 38, 40, 42 which includes a sensor for sensing the position of the respective lever and generating an electrical signal accordingly which is transmitted to ECU 30 via dedicated wires 44, 46, 48.

In an alternative embodiment the levers 32, 33, 36 may be instead mechanically coupled to the valves 12, 34, 56 thus dispensing with the electrical connections and the solenoids.

A driver terminal 50 is connected electrically to ECU 30 and includes a display 52 and a set of buttons 54 located around the periphery of the display 52. Other user input means may be provided such as the rotating knob 56 illustrated and further buttons 58.

The aforementioned description of the hydraulic control system 10 corresponds to known hydraulic control systems existing today on Massey Ferguson tractors for example. The following description will include the inventive aspects of the hydraulic system with reference in particular to FIG. 3.

Figure 2:
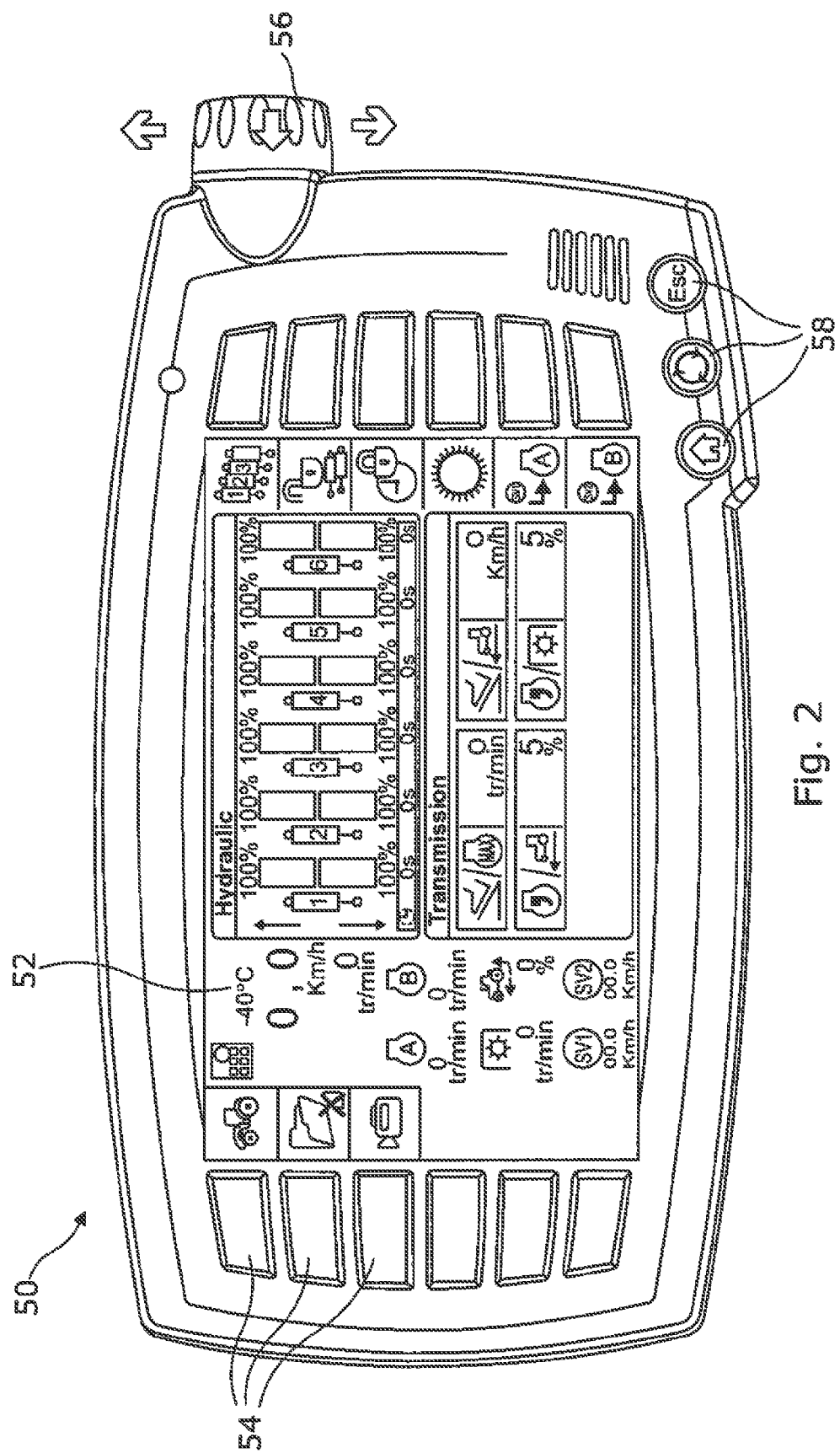
FIG. 2 shows a driver terminal included in the control system of FIG. 1.

The terminal 50 permits an operator to switch between a variety of different display modes each conveying various parameters related to functions on the tractor and/or implement. In a hydraulic display mode, as illustrated in the upper half of display 52 in FIG. 2 and shown in isolation in FIG. 3, each hydraulic output is represented by a graphic 61-66.

It should be understood that a dual acting hydraulic cylinder such those illustrated in FIG. 1 are connected to two hydraulic outputs and are thus represented in the hydraulic display mode by two graphics.

More specifically a first graphic 61 corresponds to a first output 71 connected to the right hand end of cylinder 18. The second graphic 62 represents second output 72 connected to the left hand end of first cylinder 18. Third graphic 63 corresponds to third output 73 connected to the right hand end of second cylinder 20. Fourth graphic 64 corresponds to fourth output 74 connected to the left hand end of second cylinder 20. Fifth graphic 65 corresponds to fifth output 75 connected to the right hand end of third cylinder 22. Sixth graphic 66 corresponds to sixth output 76 connected to the left hand end of third cylinder 22.

As in known systems each graphic 61-66 is displayed adjacent a respective level indicator 81-86 which displays the current flow of hydraulic fluid through that output wherein flow in one direction is represented in a top bar and flow in the opposite direction is represented in the bottom bar from a range of 0% to 100%. It should be understood that colour may also be employed to improve the conveyance of data to a driver.

In accordance with the invention each graphic 61-66 includes a label which can be defined by the operator. Therefore, an operator can label each graphic with an indication as to the function currently coupled to a given hydraulic output. For example, in FIG. 3 the first graphic 61 has been assigned a label 'axle L' whereas the second graphic 62 has assigned a label 'axle R'. This provides the operator with an immediately viewable indication that first lever 32 controls the steering axle of a trailer currently coupled to the tractor.

Similarly third and fourth graphics 63 64 have been assigned a label 'body +' and 'body −' respectively to show the driver that second lever 34 (corresponding to second valve 34) controls the lift of the trailer body. For completeness, fifth and sixth graphic 65, 66 have been assigned a label 'door +' and 'door −' respectively to show the operator that third control lever 36 currently controls the rear tailgate of the attached trailer.

Conveniently, the operator can input the labels via the various user input means 54, 56, 58 associated with the terminal 50. Alternatively, separate data input means maybe provided such as a touch sensitive area on screen 52 or means to receive a data carrier such a memory stick upon which the labels are stored.

In this example, each label simply comprises text. However, it is envisaged that labels that represent a function graphically may instead be available to the user. In this case, a user may select an icon from a list of icons for example. The icons may be pre-programmed into the terminal, defined or designed by the user, or downloaded from an external source and saved on the terminal.

Figure 3:
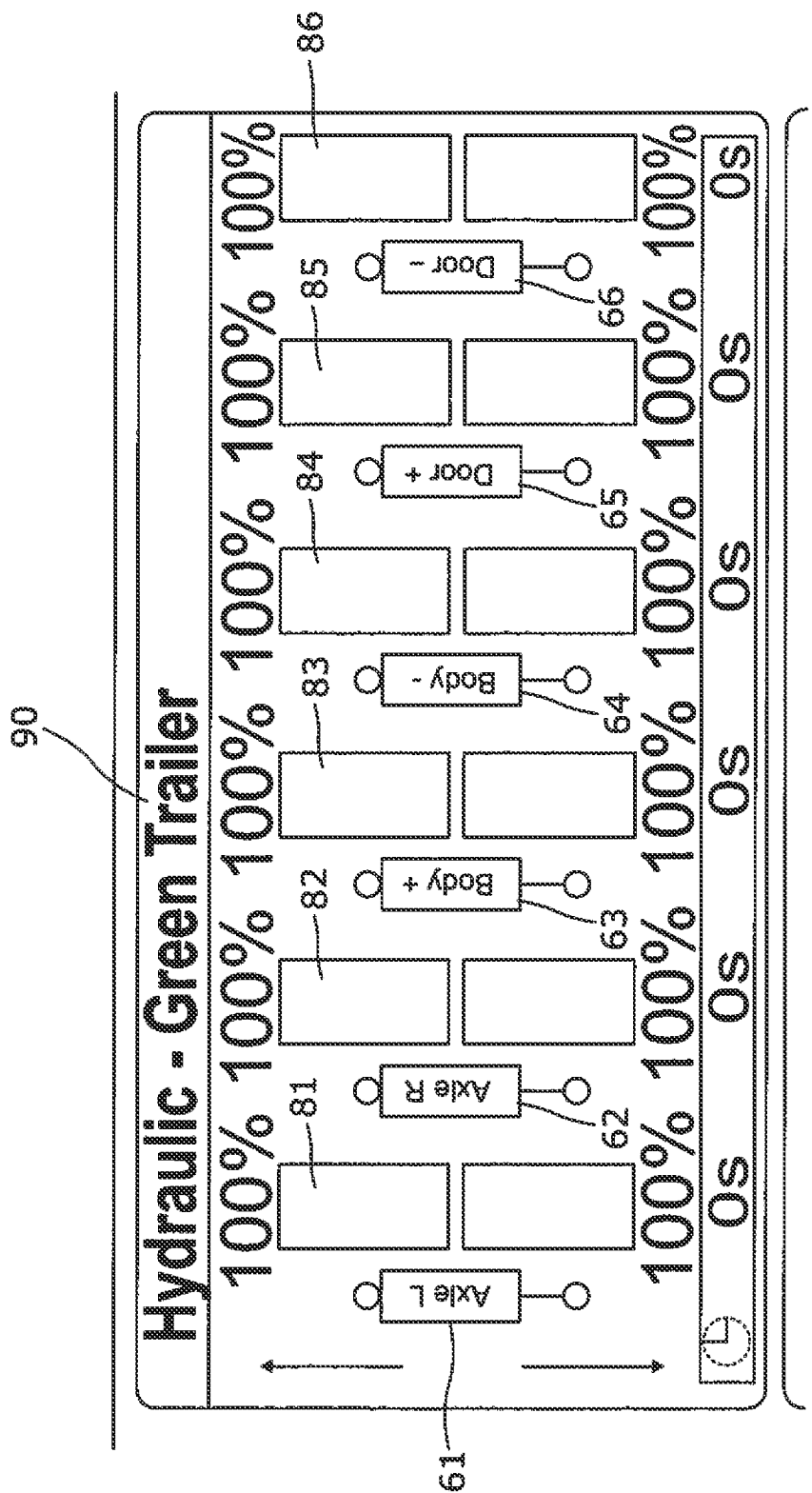
FIG. 3 is an enlarged view of part of the display shown in FIG. 2.

Each set of labels 61-66 may itself be assigned a 'group label' by the operator such as 'Green Trailer' 90 illustrated in the example of FIG. 3.

The terminal 50, or other means, stores each data set so that it may be retrieved at a later stage. Advantageously, this avoids the need to enter each label every time an implement is changed on the tractor. Therefore, it is envisaged that each set of labels corresponding to a given implement should only be required to be entered by the operator once upon when they are stored.

The invention claimed is:

1. A hydraulic apparatus control system comprising a plurality of directional control valves each for selectively conveying pressurised fluid to a hydraulic consumer detachably connected to a respective hydraulic output, a plurality of user interface devices to control the valves, a terminal comprising a display and user input means, wherein the display displays a graphic associated with each hydraulic output, and wherein each graphic includes a displayed user-definable label.

2. A control system further comprising memory means which stores a set of said user-definable labels as a stored dataset, wherein the stored dataset can be recalled by a user.

3. A control system according to claim 2, wherein the memory means stored a plurality of sets of said user-defined labels as respective datasets, wherein one of said stored datasets can be selected and recalled by a user from said plurality of sets.

4. A control system according to claim 2, wherein a stored set of said user-definable labels may be assigned a name via the user input means.

5. A control system according to claim 2, further comprising an electronic control unit which comprises the memory means.

6. A control system according to claim 1, further comprising an electronic control unit (ECU) connected to the terminal.

7. A control system according to claim 6, wherein the user interface devices generate electrical signals which are communicated to the ECU.

8. A control system according to claim 7, wherein the directional control valves are solenoid-actuated and respond to electrical signals.

9. A control system according to claim 1, wherein the user interface devices are coupled to respective directional control valves by a mechanical coupling which operates a spool to activate the valve.

10. A control system according to claim 1, wherein at least one user interface device is a lever which has a central neutral position and two activation positions either side of the neutral position.

11. A control system according to claim 1, wherein the user input means comprises a plurality of buttons located around the periphery of the display.

12. A control system according to claim 1, wherein the user input means comprises a touch sensitive display.

13. An agricultural tractor comprising a hydraulic apparatus control system comprising a plurality of directional control valves each for selectively conveying pressurised fluid to a hydraulic consumer detachably connected to a respective hydraulic output, a plurality of user interface devices to control the valves, a terminal comprising a display and user input means, wherein the display displays a graphic associated with each hydraulic output, and wherein each graphic includes a displayed user-definable label.

* * * * *